(12) United States Patent
Park et al.

(10) Patent No.: US 9,083,022 B2
(45) Date of Patent: Jul. 14, 2015

(54) ELECTRODE ACTIVE MATERIAL FOR LITHIUM SECONDARY BATTERY

(71) Applicant: LG CHEM, LTD., Seoul (KR)

(72) Inventors: Sinyoung Park, Daejeon (KR); Sung kyun Chang, Daejeon (KR); Hong-Kyu Park, Daejeon (KR); Seung Tae Hong, Daejeon (KR); Youngsun Choi, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 14/460,553

(22) Filed: Aug. 15, 2014

(65) Prior Publication Data

US 2014/0346394 A1 Nov. 27, 2014

Related U.S. Application Data

(62) Division of application No. 12/792,374, filed on Jun. 2, 2010.

(30) Foreign Application Priority Data

Jun. 3, 2009 (KR) .................. 10-2009-0049259

(51) Int. Cl.
H01M 4/1391 (2010.01)
H01M 4/505 (2010.01)
H01M 4/525 (2010.01)
H01M 4/04 (2006.01)
C01G 53/00 (2006.01)
H01M 4/131 (2010.01)
H01M 10/052 (2010.01)

(52) U.S. Cl.
CPC ............. *H01M 4/0471* (2013.01); *C01G 53/44* (2013.01); *C01G 53/50* (2013.01); *H01M 4/1391* (2013.01); *H01M 4/505* (2013.01); *H01M 4/525* (2013.01); *C01P 2002/20* (2013.01); *C01P 2002/22* (2013.01); *C01P 2002/52* (2013.01); *C01P 2002/88* (2013.01); *C01P 2004/03* (2013.01); *C01P 2004/45* (2013.01); *C01P 2004/61* (2013.01); *C01P 2006/40* (2013.01); *H01M 4/131* (2013.01); *H01M 10/052* (2013.01); *Y02E 60/122* (2013.01)

(58) Field of Classification Search
CPC ... H01M 3/131; H01M 4/139; H01M 4/1391; H01M 4/131; H01M 4/13914; H01B 1/22
USPC ........ 252/182.1; 429/223, 224, 231.1, 231.95
See application file for complete search history.

(56) References Cited

U.S. PATENT DOCUMENTS 6,589,694 B1 * 7/2003 Gosho et al. ............... 429/231.1
2007/0292761 A1 12/2007 Park et al.

* cited by examiner

*Primary Examiner* — Khanh Tuan Nguyen
*Assistant Examiner* — Haidung Nguyen
(74) *Attorney, Agent, or Firm* — Birch, Stewart, Kolasch & Birch, LLP

(57) ABSTRACT

Provided is an electrode active material comprising a nickel-based lithium transition metal oxide ($LiMO_2$) wherein the nickel-based lithium transition metal oxide contains nickel (Ni) and at least one transition metal selected from the group consisting of manganese (Mn) and cobalt (Co), wherein the content of nickel is 50% or higher, based on the total weight of transition metals, and has a layered crystal structure and an average primary diameter of 3 μm or higher, wherein the amount of $Ni^{2+}$ taking the lithium site in the layered crystal structure is 5.0 atom % or less.

6 Claims, 7 Drawing Sheets

US 9,083,022 B2

ELECTRODE ACTIVE MATERIAL FOR LITHIUM SECONDARY BATTERY

This application is a Divisional of application Ser. No. 12/792,374, filed Jun. 2, 2010, which claims the benefit of the filing date of Korean Patent Application No. 10-2009-0049259, filed on Jun. 3, 2009, in the Korean Intellectual Property Office, the disclosure of which is incorporated herein in its entirety by reference.

FIELD OF THE INVENTION

The present invention relates to an electrode active material for lithium secondary batteries. More specifically, the present invention relates to an electrode active material comprising a nickel-based lithium transition metal oxide ($LiMO_2$) wherein the nickel-based lithium transition metal oxide contains nickel (Ni) and at least one transition metal selected from the group consisting of manganese (Mn) and cobalt (Co), wherein the content of nickel is 50% or higher, based on the total weight of transition metals, and has a layered crystal structure and an average primary diameter of 3 μm or higher, wherein, for the layered crystal structure, the amount of $Ni^{2+}$ taking the lithium site is 5.0 atom % or less.

BACKGROUND OF THE INVENTION

Technological development and increased demand for mobile equipment have led to a rapid increase in the demand for secondary batteries as energy sources. Among these secondary batteries, lithium secondary batteries having high energy density and voltage, long cycle span and low self-discharge are commercially available and widely used.

Meanwhile, the lithium secondary batteries generally use lithium cobalt composite oxide ($LiCoO_2$) as a cathode active material. Also, the use of lithium-manganese composite oxides such as $LiMnO_2$ having a layered crystal structure and $LiMn_2O_4$ having a spinel crystal structure and lithium nickel composite oxide ($LiNiO_2$) as the cathode active material has been considered.

Among these cathode active materials, $LiCoO_2$ is the most generally used owing to superior physical properties such as superior cycle characteristics, but has low stability and is costly due to resource limitations of cobalt used as a raw material, thus disadvantageously having limited mass-utilization as power sources for electric vehicles.

Lithium manganese oxides such as $LiMnO_2$ and $LiMn_2O_4$ advantageously are redundant resources and use environmentally friendly manganese, thus attracting much attention as a cathode active material alternative to $LiCoO_2$. However, these lithium manganese oxides have disadvantages of low capacity and bad cycle characteristics.

On the other hand, lithium nickel oxides such as $LiNiO_2$ are cheaper than the cobalt oxides and exhibit higher discharge capacity, when charged to 4.3V and reversible capacity of doped $LiNiO_2$ reaches about 200 mAh/g which is higher than $LiCoO_2$ capacity (about 165 mAh/g). Accordingly, in spite of slightly low average discharge voltage and volumetric density, commercial batteries comprising $LiNiO_2$ as a cathode active material have improved energy density and a great deal of research on these nickel-based cathode active materials is thus actively conducted in order to develop high-capacity batteries. However, the problems of $LiNiO_2$-based cathode active materials, including high preparation costs, swelling caused by gas generation in batteries, low chemical stability and high pH have not been solved yet.

In this regard, many conventional techniques focus on properties of $LiNiO_2$-based cathode active materials and methods for preparing $LiNiO_2$ and suggest lithium transition metal oxides wherein nickel is partially substituted by other transition metals such as Co or Mn.

Meanwhile, lithium transition metal oxides used as cathode active materials are in the form of a single particle (referred to as a "primary particle") forming an independent structure, or of an aggregate particle (referred to as a "secondary particle") wherein two or more primary particles form an independent structure.

For such particle shapes, when an average particle diameter of primary particles (referred to as "average primary particle diameter") is large, the press density of electrodes can be improved and capacity of secondary batteries can thus be considerably improved. In addition, variations in specific surface area with passage of time are decreased, making it easier to handle particles (in the form of a powder) and improving processability. Accordingly, a great deal of study to prepare lithium transition metal oxides which can exert desired performance through prevention of deterioration in tap density or optimization of particle shapes such as preparation of spherical particles based on control of factors such as particle size is underway.

However, in spite of these many advantages, nickel-based lithium transition metal oxides having an average primary particle diameter cannot be applied to general batteries. This is the reason that conventional techniques do not enable preparation of nickel-based lithium transition metal oxides having a large average primary particle diameter and a completely-grown crystal structure, thus exhibiting desired electrochemical performance.

In this regard, some related patents disclose primary particle diameters of Ni-, Mn- and Co-based lithium transition metal oxides.

For example, Japanese Patent Publication No. 2003-68299 discloses Li—Mn—Ni—Co oxides having an average primary particle diameter of 3 μm or less. When the average diameter is higher than 3 μm, an electrolyte solution cannot be permeated into the particles. Preferably, the average diameter is 1 μm or less. In addition, Comparative Example demonstrates that, when the primary particle diameter is 2 μm or higher, battery performance, such as discharge capacity and cycle properties, is deteriorated.

Korean Patent Laid-open No. 2008-0031424 discloses a cathode active material having a primary particle diameter of 0.1 μm to 3 μm. In addition, when the primary particle diameter is 3 μm or higher, a ratio of lithium ions which do not contribute to charge-discharge increases. Accordingly, it is preferred that the average diameter be 0.2 μm or less.

Also, many patents such as Japanese Patent Publication No. 2003-221236, Korean Patent Laid-open No. 2007-0097115 and Japanese Patent Publication No. 2008-84826 insist that an average primary particle diameter should be small.

However, as mentioned below, as a result of a variety of extensive and intensive studies and experiments, and analysis and consideration associated therewith, the inventors of the present invention confirmed that, in the case where the average primary particle diameter is several micrometers (μm) or higher and a stable crystal structure is thus realized, nickel-based active materials exhibiting superior electrochemical performance can be prepared.

Meanwhile, unlike the afore-mentioned patents, some related patents suggest an active material having a relatively large primary particle diameter.

Specifically, Korean Patent Publication No. 2004-0106207 discloses a cathode material wherein a plurality of primary particles are aggregated to form a secondary particle, and a length at which adjacent primary particles are bound to each other on the cross-section of secondary particle is 10 to 70% with respect to the total circumference of the cross-section of primary particles. In this patent, the primary particle diameter is within the range of 0.2 to 10 µm. However, this patent teaches that Comparative Example is performed at a temperature which is unsuitable to realize relatively normal electrochemical performance and the results thus obtained are compared with those of Example. When the sintering temperature is excessively low, the desired crystal structure is not formed and electrochemical performance of a material is deteriorated.

Accordingly, this patent does not teach a cathode material having a substantially large primary particle and exhibiting electrochemical performance.

Also, Japanese Patent Publication No. 2005-25975 suggests lithium nickel manganese cobalt-based oxides which are represented by $Li_{1+x}Ni_{1-y-z-p}Mn_yCo_zM_pO_2$ ($0 \leq x \leq 0.2$, $0.1 \leq y \leq 0.5$, $0.1 \leq z \leq 0.5$, $0 \leq z \leq 0.2$, $0.2 \leq y+z+p \leq 0.8$) and have an average primary particle diameter of 3 to 20 µm. However, it is the most important that oxide particles have a large average primary particle diameter and superior crystallinity and thus exhibit superior electrochemical performance. The patent does not disclose such a crystal structure and electrochemical performance. In addition, the method for preparing the crystal structure comprises a multi-step heating process such as heating under non-oxidative atmosphere. The present invention enables preparation of a cathode material having a large and high average primary particle diameter and thus exhibiting superior electrochemical performance through conventional single heating.

Also, Japanese Patent Publication No. 2006-54159 discloses a cathode active material for non-aqueous secondary batteries which contains nickel and lithium as main ingredients, is represented by $Li_xNi_{1-p-q-r}Co_pAl_qArO_{2-y}$ ($0.8 \leq x \leq 1.3$, $0<p \leq 0.2$, $0<q \leq 0.1$, $0 \leq r \leq 0.1$, $-0.3<y<0.1$) and is composed of single crystals having an average particle diameter of 2 to 8 µm. However, this patent discloses an active material which necessarily comprises inorganic chlorides or inorganic chloride oxides and teaches that, when an active material does not contain inorganic chlorides or inorganic chloride oxides or does not contain a sufficient amount thereof, growth of primary particles is inhibited.

As mentioned above, regarding the primary particle size, the related patents have different views. This is the reason that conventional patents focus on only the size of particles without considering the crystal structure of materials.

Accordingly, there is an increasing need for electrode active materials for lithium secondary batteries having a large average primary particle diameter and a stable crystal structure, thus exhibiting good electrochemical performance.

DISCLOSURE

Technical Problem

Therefore, the present invention has been made to solve the above problems and other technical problems that have yet to be resolved.

As a result of a variety of extensive and intensive studies and experiments to solve the problems as described above, the inventors of the present invention have discovered that an electrode active material for lithium secondary batteries having a stable crystal structure and thus exerting superior electrochemical performance can be prepared from lithium transition metal oxide having a layered crystal structure wherein Ni content is 50% or higher, based on the total weight of all transition metals, and having a predetermined average particle diameter or higher and a specific microstructure. The present invention was completed based on this discovery.

Technical Solution

Accordingly, the present invention provides an electrode active material for lithium secondary batteries composed of nickel-based lithium transition metal oxides ($LiMO_2$) which comprise nickel (Ni) and at least one transition metal (M) selected from the group consisting of manganese (Mn) and cobalt (Co), wherein Ni is present in an amount of 50 mol %, based on the total mole number of all transition metals, and has a layered crystal structure and an average primary particle diameter of 3 µm or higher, and the amount of $Ni^{2+}$ taking the lithium site of the layered crystal structure is lower than 5.0 atoms % or less.

As used herein, the term "average primary particle diameter" means not only an average particle diameter of a primary particle as mentioned above, but also an average particle diameter of a primary particle, for secondary particles wherein a plurality of primary particles form an aggregate independent structure.

In accordance with the present invention, lithium transition metal oxides containing a large amount of nickel exhibit superior electrochemical performance although they have a larger primary particle, as compared to conventional lithium transition metal oxides.

As such, the fact that lithium transition metal oxides exhibit superior electrochemical properties in spite of large average primary particle diameter of 3 µm or higher is due to high crystallinity based on the microstructure.

That is, for the layered crystal structure, the amount of $Ni^{2+}$ taking the lithium site is 5.0 atom % or less and a more detailed explanation thereof is mentioned below.

For nickel-based lithium transition metal oxides having a layered structure of the present invention, the size difference of cations is an essential factor to form a crystal structure. Specifically, for nickel-based lithium transition metal oxides, as the size difference between the lithium ion and the transition metal ion increases, a material having a complete and high crystallinity structure can be prepared.

For lithium transition metal oxides, comparing cation sizes, the size difference between $Ni^{3+}$, $Co^{3+}$ or $Mn^{4+}$, and $Li^+$ is great and the possibility of cation mixing occurring is thus considerably low. On the other hand, among nickel ions, nickel bivalent cations ($Ni^{2+}$) have a large size, comparable to lithium ions, thus causing the cation mixing behaviors. When $Ni^{2+}$ is mixed with $Li^+$ and is incorporated in the lithium layer, the crystallinity of ion structures is deteriorated, thus causing deterioration in battery performance.

FIGS. 1, 2 and 3 are TG graphs showing weight decrease as a function of elevating temperature, for a nickel salt, a manganese salt and a cobalt salt, respectively. As can be seen from the graphs, since nickel is considerably stable in the +2 state unlike manganese or cobalt, for a substance containing a great amount of nickel, the amount of $Ni^{2+}$ increases.

That is to say, a material containing a great amount of nickel, more specifically, a material containing nickel in an amount of 50 mol % or higher, based on the total content of transition metals, contains a great amount of $Ni^{2+}$. Such $Ni^{2+}$ is larger than other ions and is comparable in size to a lithium ion, and may be thus mixed in the lithium layer. $Ni^{2+}$ incorporated into the lithium layer inhibits transfer of lithium ions in nickel particles, thus causing deterioration in battery performance. This problem always occurs in lithium transition metal oxides containing a great amount of nickel, in particular, becomes more serious in materials containing a great amount of nickel.

On the other hand, for nickel-based lithium transition metal oxides, the amount of $Ni^{2+}$ taking lithium sites in a layered crystal structure is 5.0 atom % or less, thus efficiently inhibiting incorporation of $Ni^{2+}$ into the lithium layer and exhibiting superior crystallinity. As a result, the nickel-based lithium transition metal oxides exhibit superior electrochemical performance due to their more stable layered structure. More preferably, $Ni^{2+}$ taking the lithium sites may be present in an amount of 0.1 to 4.0 atom %.

The nickel-based lithium transition metal oxides according to the present invention comprise nickel (Ni) in an excessive amount of 50% or higher, based on the total mole number of transition metals, thus exerting high capacity. Preferably, the content of Ni is 50% to 90%. When the content of Ni is less than 50%, high capacity cannot be realized. On the other hand, when the content of Ni exceeds 90%, impurities are increased and high-temperature stability is thus considerably deteriorated due to high reactivity with an electrolyte solution.

As mentioned above, the nickel-based lithium transition metal oxide contains nickel (Ni) and at least one transition metal selected from the group consisting of manganese (Mn) and cobalt (Co). Preferably, the nickel-based lithium transition metal oxide contains both manganese (Mn) and cobalt (Co). In this case, Mn is present in an amount of 10% to 45% and Co is present in an amount of 5% to 40%, based on the total mole number of transition metals.

In this case, the transition metals may be partially substituted by one or more elements selected from the group consisting of Al, Mg, Ti and Zr.

The amount of elements substituted is 0.1 to 5%, based on the total mole number of transition metals. When the content is less than 0.1%, the effects obtained by substitution cannot be realized. On the other hand, when the content exceeds 5%, the amount of transition metals such as nickel is decreased and battery capacity is disadvantageously thus decreased.

As mentioned above, the nickel-based lithium transition metal oxide of the present invention has a high-crystallinity structure and an average primary particle diameter of 3 μm or higher, more preferably, 3 to 10 μm.

The electrode active material comprising nickel-based lithium transition metal oxides may have a primary particle structure composed of single particles with an average particle diameter of 3 μm or higher, or a secondary particle structure which is composed of an aggregate of the single particles and has inner pores. Such an aggregate-type particle structure maximizes the surface area at which the particles react with an electrolyte solution, thereby exerting high rate characteristics and improving reversible cathode capacity.

In a preferred embodiment, for the nickel-based lithium transition metal oxide of the present invention, a ratio of a transition metal (M) to lithium is 1.005 to 1.30, based on the mole number, more preferably, 1.01 to 1.20. As mentioned below, this ratio is important to form a specific crystal microstructure.

Also, the present invention provides a lithium secondary battery comprising the electrode active material as a cathode active material. The lithium secondary battery, for example, comprises a cathode, an anode, a separator, and a lithium salt-containing non-aqueous electrolyte.

For example, the cathode is prepared by applying a cathode mix comprising a cathode active material, a conductive material, a binder and a filler to a cathode current collector, followed by drying. The cathode mix may comprise the aforementioned ingredients, i.e., the conductive material, the binder and the filler.

As examples of the anode active material that can be used in the present invention, mention may be made of carbon and graphite materials such as natural graphite, artificial graphite, expanded graphite, carbon fibers, non-graphitizing carbon, carbon black, carbon nanotubes, fullerenes and activated carbon; metals such as Al, Si, Sn, Ag, Bi, Mg, Zn, In, Ge, Pb, Pd, Pt and Ti, which are alloyable with lithium metal, and compounds containing such elements; a composite material of a metal or metal compound and a carbon or graphite material; and lithium nitride. Among these, more preferred are the carbon-, silicon-, tin-, silicon/carbon-based active materials, which may be used alone or in any combination thereof.

The separator is interposed between the cathode and anode. As the separator, an insulating thin film having high ion permeability and mechanical strength is used. The separator typically has a pore diameter of 0.01 to 10 μm and a thickness of 5 to 300 μm. As the separator, sheets or non-woven fabrics made of an olefin polymer such as polypropylene and/or glass fibers or polyethylene, which have chemical resistance and hydrophobicity, are used. When a solid electrolyte such as a polymer is employed as the electrolyte, the solid electrolyte may also serve as both the separator and electrolyte.

Examples of binders that may be used in the present invention include polytetrafluoroethylene (PTFE), polyvinyl alcohols, carboxymethylcellulose (CMC), starch, hydroxypropylcellulose, regenerated cellulose, polyvinyl pyrollidone, tetrafluoroethylene, polyethylene, polypropylene, ethylene-propylene-diene terpolymers (EPDM), sulfonated EPDM, styrene butadiene rubbers, fluoro rubbers, various copolymers, highly-saponificated polyvinyl alcohols and the like.

The conductive material improves conductivity of the electrode active material and is commonly added in an amount of 1 to 30% by weight, based on the total weight of the electrode mix. Any conductive material may be used without particular limitation so long as it has suitable conductivity without causing adverse chemical changes in the fabricated secondary battery. As examples of the conductive materials that can be used in the present invention, mention may be made of conductive materials, including graphite such as natural or artificial graphite; carbon blacks such as carbon black, acetylene black, Ketjen black, channel black, furnace black, lamp black and thermal black; conductive fibers such as carbon fibers and metallic fibers; metallic powders such as carbon fluoride powders, aluminum powders and nickel powders; conductive whiskers such as zinc oxide and potassium titanate; conductive metal oxides such as titanium oxide; and polyphenylene derivatives.

The viscosity controlling agent is an ingredient to control the viscosity of the electrode mix and thereby easily mix the electrode mix and apply the same to a current collector, and is present in an amount of 30 wt % or less, based on the total weight of the electrode mix. Examples of viscosity controlling agents include, but are not limited to, carboxymethyl cellulose and polyvinylidene fluoride. In some cases, the afore-mentioned solvent may act as the viscosity controlling agent.

The filler is a component used to inhibit expansion of the electrode. There is no particular limit to the filler, so long as it does not cause adverse chemical changes in the fabricated battery and is a fibrous material. As examples of the filler, there may be used olefin polymers such as polyethylene and polypropylene; and fibrous materials such as glass fibers and carbon fibers.

The coupling agent is an auxiliary ingredient to improve the adhesion between electrode active materials and the binder, has two or more functional groups and may be used in an amount of 30% by weight, based on the weight of the binder. For example, the coupling agent may be a material which has one functional group which reacts with a hydroxyl group or a carboxyl group present on the surface of silicon-, tin-, graphite-based active materials to form a chemical bond and other functional groups which react with a polymeric binder to form a chemical bond. Specifically, examples of coupling agents include, but are not limited to, silane-based compounds such as triethoxysilylpropyl tetrasulfide, mercaptopropyl triethoxysilane, aminopropyl triethoxysilane, chloropropyl triethoxysilane, vinyl triethoxysilane, methacryloxypropyl triethoxysilane, glycidoxypropyl triethoxysilane, isocyanatopropyl triethoxysilane, and cyanatopropyl triethoxysilane.

The adhesion promoter is an auxiliary ingredient to improve adhesion of an active material to a current collector, is present in an amount of 10 wt %, based on the binder and examples thereof include oxalic acid, adipic acid, formic acid, acrylic acid derivatives and itaconic acid derivatives.

Examples of molecular weight controllers that can be used in the present invention include t-dodecyl mercaptan, n-dodecyl mercaptan and n-octylmercaptan. Examples of cross-linking agents include 1,3-butanediol diacrylate, 1,3-butanediol dimethacrylate, 1,4-butanediol diacrylate, 1,4-butanediol dimethacrylate, aryl acrylate, aryl methacrylate, trimethylolpropane triacrylate, tetraethylene glycol diacrylate, tetraethylene glycol dimethacrylate and divinylbenzene.

The current collector is a site where electrons are transferred during electrochemical reactions of active materials. Depending on the type of the electrode, the current collector is divided into an anode current collector and a cathode current collector.

The anode current collector is generally fabricated to have a thickness of 3 to 500 μm. There is no particular limit to the anode current collector, so long as it has suitable conductivity without causing adverse chemical changes in the fabricated battery. As examples of the anode current collector, mention may be made of copper, stainless steel, aluminum, nickel, titanium, sintered carbon, and copper or stainless steel surface-treated with carbon, nickel, titanium or silver, and aluminum-cadmium alloys.

The cathode current collector is generally fabricated to have a thickness of 3 to 500 μm. There is no particular limit to the cathode current collector, so long as it has suitable conductivity without causing adverse chemical changes in the fabricated battery. As examples of the cathode current collector, mention may be made of stainless steel, aluminum, nickel, titanium, sintered carbon, and aluminum or stainless steel surface-treated with carbon, nickel, titanium, silver or the like.

If necessary, these current collectors may also be processed to form fine irregularities on the surface thereof so as to enhance adhesion to the cathode active materials. In addition, the current collectors may be used in various forms including films, sheets, foils, nets, porous structures, foams and non-woven fabrics.

The lithium salt-containing, non-aqueous electrolyte is composed of a non-aqueous electrolyte and a lithium salt.

As the non-aqueous electrolytic solution that can be used in the present invention, for example, mention may be made of non-protic organic solvents such as N-methyl-2-pyrrolidinone, propylene carbonate, ethylene carbonate, butylene carbonate, dimethyl carbonate, diethyl carbonate, gamma-butyrolactone, 1,2-dimethoxy ethane, tetrahydroxy Franc, 2-methyl tetrahydrofuran, dimethylsulfoxide, 1,3-dioxolane, formamide, dimethylformamide, dioxolane, acetonitrile, nitromethane, methyl formate, methyl acetate, phosphoric acid triester, trimethoxy methane, dioxolane derivatives, sulfolane, methyl sulfolane, 1,3-dimethyl-2-imidazolidinone, propylene carbonate derivatives, tetrahydrofuran derivatives, ether, methyl propionate and ethyl propionate.

The lithium salt is a material that is readily soluble in the above-mentioned non-aqueous electrolyte and may include, for example, LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, chloroborane lithium, lower aliphatic carboxylic acid lithium, lithium tetraphenyl borate and imide.

In some cases, an organic solid electrolyte or an inorganic solid electrolyte may be used.

As examples of the organic solid electrolyte utilized in the present invention, mention may be made of polyethylene derivatives, polyethylene oxide derivatives, polypropylene oxide derivatives, phosphoric acid ester polymers, poly agitation lysine, polyester sulfide, polyvinyl alcohols, polyvinylidene fluoride, and polymers containing ionic dissociation groups.

As examples of the inorganic solid electrolyte utilized in the present invention, mention may be made of nitrides, halides and sulfates of lithium such as $Li_3N$, LiI, $Li_5NI_2$, $Li_3N$—LiI—LiOH, $LiSiO_4$, $LiSiO_4$—LiI—LiOH, $Li_2SiS_3$, $Li_4SiO_4$, $Li_4SiO_4$—LiI—LiOH and $Li_3PO_4$—$Li_2S$—$SiS_2$.

Additionally, in order to improve charge/discharge characteristics and flame retardancy, for example, pyridine, triethylphosphite, triethanolamine, cyclic ether, ethylenediamine, n-glyme, hexaphosphoric triamide, nitrobenzene derivatives, sulfur, quinone imine dyes, N-substituted oxazolidinone, N,N-substituted imidazolidine, ethylene glycol dialkyl ether, ammonium salts, pyrrole, 2-methoxy ethanol, aluminum trichloride or the like may be added to the non-aqueous electrolyte. If necessary, in order to impart incombustibility, the non-aqueous electrolyte may further include halogen-containing solvents such as carbon tetrachloride and ethylene trifluoride. Further, in order to improve high-temperature storage characteristics, the non-aqueous electrolyte may additionally include carbon dioxide gas.

The lithium secondary batteries of the present invention may be fabricated by a conventional method known in the art. Also, the cathode, anode and separator structures of the lithium secondary batteries are not particularly limited and, for example, respective sheets are inserted into a cylindrical, square or pouch case in a winding- or stacking-type.

In addition, the present invention provides a method for preparing the electrode active material comprising mixing a lithium-containing precursor with a transition metal-containing precursor under the condition that a molar ratio of a transition metal to lithium is higher than 1 and heating the resulting mixture at a higher temperature.

When the heating temperature is excessively low, raw materials remain in the particles due to insufficient reactions, high-temperature stability of batteries may be damaged, and volumetric density and crystallinity are deteriorated, thus making it difficult to maintain the stable shape. On the other hand, when the heating temperature is excessively high, particles may be non-uniformly grown, oxygen deintercalation of the structure occurs, and electrochemical performance of a material is also deteriorated.

Accordingly, the heating temperature is higher (10° C. or higher) than a heating temperature at which lithium transition metal oxide containing an equivalent amount of lithium and a transition metal (that is, lithium transition metal oxide having a layered crystal structure, wherein a mix ratio of a transition metal to lithium is 1), is prepared from a mixture of a lithium-containing precursor and a transition metal-containing precursor, and is lower than an oxygen deintercalation temperature of the lithium transition metal oxide.

Generally, nickel-based lithium transition metal oxide has a suitable sintering temperature, depending on the composition of transition metals. This is the reason that the sintering temperature is closely related to development of crystal structure.

When the sintering temperature is lower than the desired level, the crystal structure of a material is insufficient, thus causing deterioration in electrochemical performance. In addition, a sufficient energy is preferably supplied to efficiently develop a crystal structure for material growth. Accordingly, it is preferred that the sintering temperature is sufficiently high to grow a crystal structure.

However, when the sintering temperature is excessively high, out of the desired range, oxygen deintercalation in the structure occurs and the structure is deformed. FIG. 4 is a TG graph showing weight variation of a mixture of a transition metal salt and a lithium salt, with heating. When the temperature is higher than a predetermined level, all reactions are completed, the weight does not decrease, and the state is maintained although the temperature increases. However, when the temperature is increased to a higher level, oxygen is deintercalated and, at the same time, weight is decreased.

When oxygen is deintercalated, $Ni^{2+}$ having a lower oxidation number is generated to maintain electric balance, thus deforming the layered structure. Accordingly, sintering of nickel-based lithium transition metal oxides is generally performed at a predetermined sintering temperature. As mentioned above, this is the reason that when the sintering temperature is out of a general range, the crystal structure of a material cannot form a stable layered structure.

Meanwhile, the average primary particle diameter of nickel-based lithium transition metal oxide is also related to sintering conditions. When a nickel-based compound is prepared while elevating the sintering temperature, as the sintering temperature increases, the average primary particle diameter of particles gradually increases (See Comparative Example, Table 5). Accordingly, when the sintering temperature is increased to a considerably high level, nickel-based lithium transition metal oxide having a large average primary particle diameter can be obtained. When the average primary particle diameter increases, various advantages including an increase in press density of a material can be obtained.

However, when the sintering temperature is elevated to a higher level in order to increase an average primary particle diameter, oxygen is deintercalated and $Ni^{2+}$ is thus generated. For this reason, $Ni^{2+}$ is incorporated into the lithium layer, thus deforming the crystal structure and causing deterioration in electrochemical performance.

Accordingly, it was known that it is important to prepare nickel-based lithium transition metal oxide having a large average primary particle diameter and a stable structure, thus exhibiting superior electrochemical performance. For this reason, synthesis is generally performed at a sintering temperature which is not excessively high and is not excessively low and conventional nickel-based lithium transition metal oxides have a small average primary particle diameter of 0.1 to 1 μm.

In this regard, nickel-based lithium transition metal oxide wherein a ratio of a transition metal to lithium is higher than 1, more preferably, 1.005 to 1.30 is prepared.

The afore-mentioned reaction conditions enable preparation of a crystal structure having superior crystallinity. Considering the fact that lithium and a transition metal take respective sites, as the amount of lithium ions increases, a ratio at which the lithium ions take the lithium site increases. In addition, an oxidation number of the transition metal, in particular, nickel (Ni), in lithium transition metal oxides increases. That is, $Ni^{2+}$ is converted into $Ni^{3+}$. As the oxidation number of transition metals increases, the bonding energy between the transition metal ion and the oxygen ion increases and the distance between transition metal layers narrows. As a result, the distance between the lithium layer and the transition metal layer increases. Accordingly, lithium ions having a large size are not incorporated into the transition metal layer and remain in the lithium layer. As a result, the crystal structure having superior crystallinity is realized, thus promoting movement of lithium in the structure and improving electrochemical performance of batteries.

However, when an excessive amount of lithium is added, lithium residues such as $Li_2CO_3$ or $LiOH$ remain on the particle surface, thus adversely affecting processes required for battery fabrication and battery performance. Conventional Ni, Mn, and Co-based lithium transition metal oxides exhibiting superior electrochemical performance are composed of secondary particles wherein primary particles having an average particle diameter of about 1 μm or less are aggregated. Accordingly, a surface area in which particles contact the outside increases, a great amount of reaction residues are generated due to the side reaction with an electrolyte, when finally fabricated batteries are operated, and problems such as swelling occur.

On the other hand, as mentioned above, when synthesis is simply performed using an excess of lithium under conventional sintering temperature conditions, more lithium residues remain, as compared to the case where lithium in a mole number equivalent to nickel is sintered. Accordingly, as mentioned above, although crystallinity improvement can be realizes when an excess of lithium is added, Ni, Mn and Co-based lithium transition metal oxides entail the problem such as swelling due to lithium residues and simple addition of excess lithium is thus unsuitable.

Consequently, to synthesize nickel-based lithium transition metal oxides having a large average primary particle diameter and a crystal structure with superior crystallinity, thus exhibiting superior electrochemical performance, sintering should be carried out at a temperature higher than a general sintering temperature and a ratio of a transition metal to lithium should be higher than 1.

As mentioned above, when the sintering temperature is simply increased, the problem, incorporation of $Ni^{2+}$ into the lithium layer, occurs, but excess lithium is added to increase the possibility in which lithium ions take the lithium site, and larger $Ni^{2+}$ is converted into smaller $Ni^{3+}$ to inhibit incorporation of nickel ions into the lithium layer. Accordingly, lithium transition metal oxide which has an average primary particle diameter of 3 μm or higher and exhibits superior electrochemical performance can be obtained. In addition, as the average primary particle diameter increases, a specific surface area at which particles contact the outside decreases, thus reducing side reactions with the electrolyte. That is, when lithium transition metal oxides are synthesized using the method according to the present invention, the problem, an increase in lithium residues caused by addition of excess lithium, can be solved by increasing the average primary particle diameter.

BRIEF DESCRIPTION OF THE DRAWINGS

The above and other objects, features and other advantages of the present invention will be more clearly understood from the following detailed description taken in conjunction with the accompanying drawings, in which.

BEST MODE

Now, the present invention will be described in more detail with reference to the following Examples. These examples are provided only for illustrating the present invention and should not be construed as limiting the scope and spirit of the present invention.

Example 1

Figure 1:
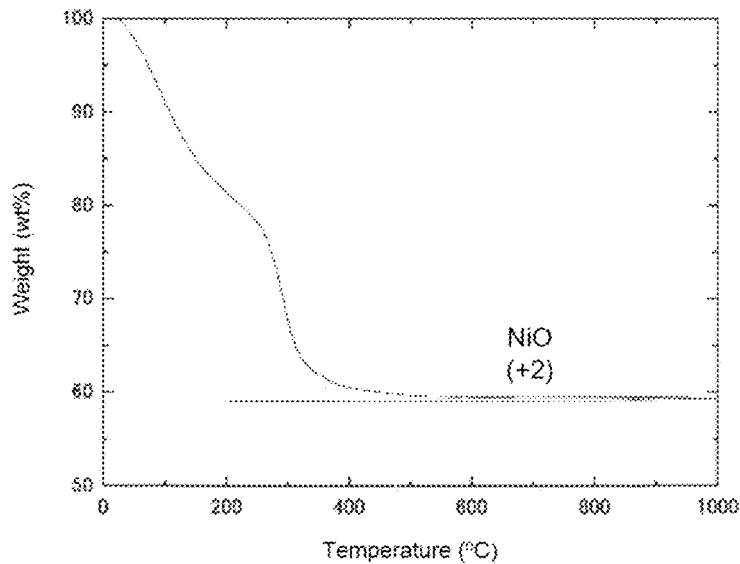
FIGS. 1, 2 and 3 are TG graphs showing weight decrease as a function of elevating temperature, for a nickel salt, a manganese salt and a cobalt salt, respectively.
Figure 2:
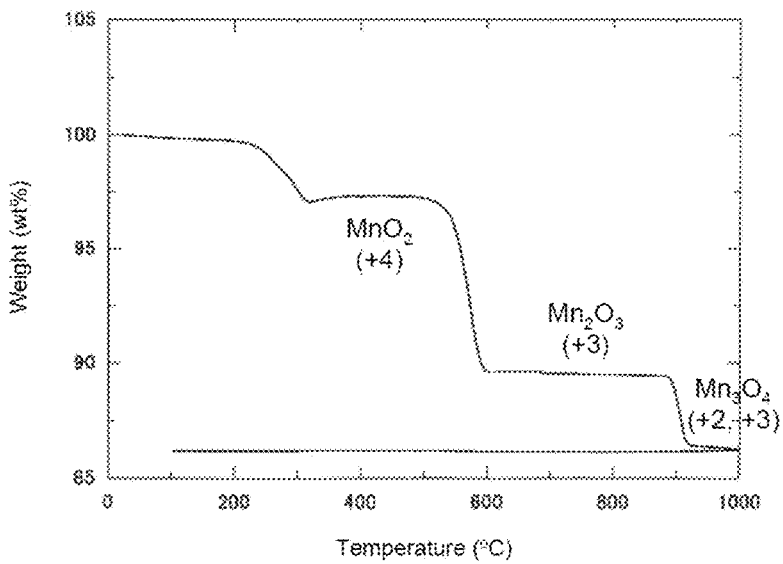
Figure 3:
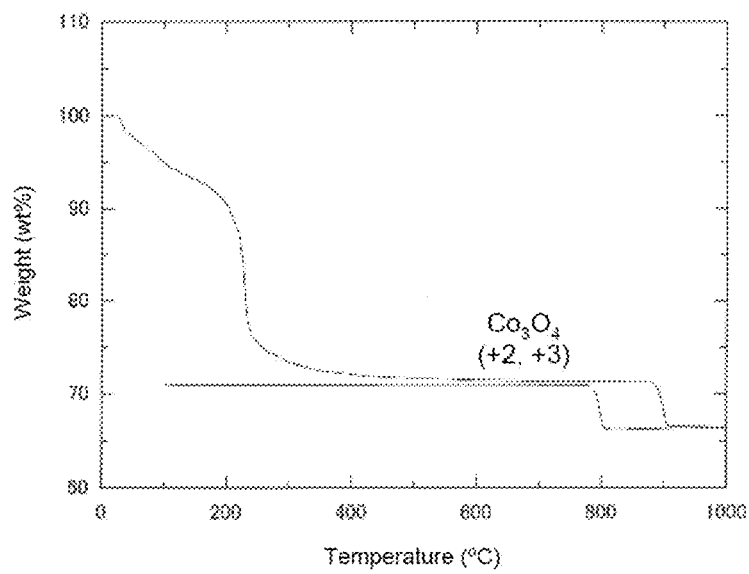
Figure 4:
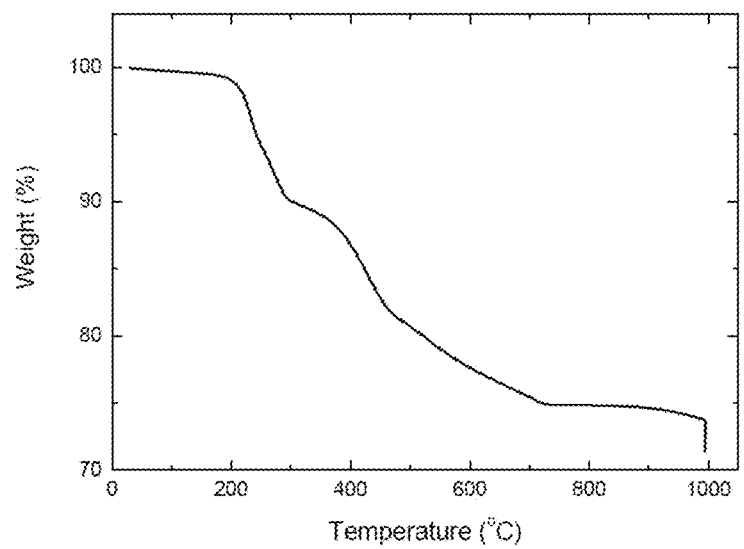
FIG. 4 is a TG graph showing weight variation of a mixture of a transition metal salt and a lithium salt, with heating.
Figure 5:
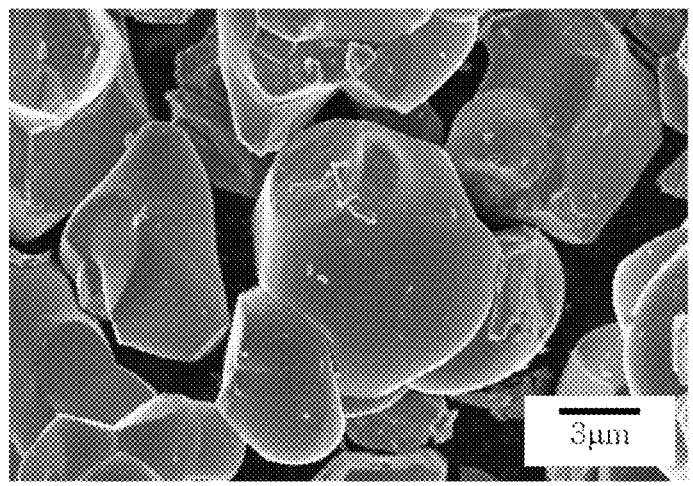
FIG. 5 is an SEM image showing lithium transition metal oxide prepared in Example 1.

Ni, Mn and Co salts (hereinafter, referred to as metal hydroxides) were added in molar ratios of the transition metals mentioned below for electrode active materials to distilled water and thoroughly mixed, to prepare a precipitate while increasing pH. The precipitate thus prepared was washed, filtered using a filter paper and dried in an oven at 130° C. overnight to obtain a powder. The powder was mixed with a Li salt in an amount, enabling that the amount of $Ni^{2+}$ taking all lithium sites of the resulting lithium transition metal oxide is 5.0 atom % or less, and the mixture was heated in an electric furnace at 940° C. for 12 hours such that the average primary particle diameter was 3 μm or higher to prepare an electrode active material (See FIG. 5). For the electrode active materials thus prepared, molar ratios of transition metals, Ni, Mn and Co were 67%, 13% and 20%, respectively.

Comparative Example 1

An electrode active material was prepared in the same manner as Example 1, except that the molar number of transition metal in the transition metal salt was equivalent to that of lithium in the lithium salt, and the mixed powder was heated in an electric furnace at 940° C. for 12 hours such that the average primary particle diameter was 3 μm or higher.

Comparative Example 2

Figure 7:
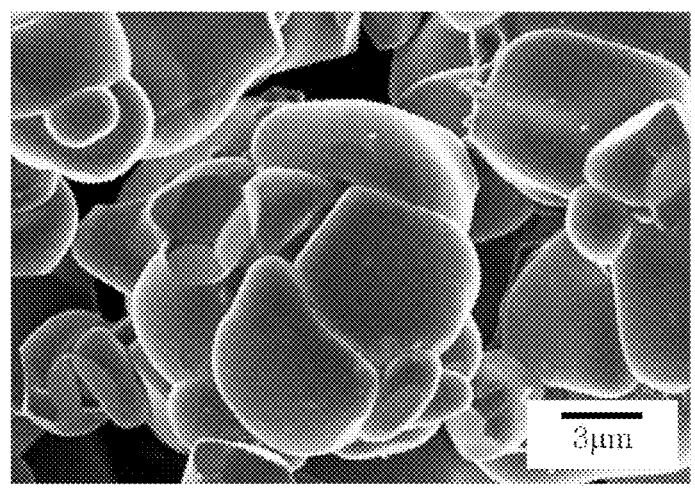
FIG. 7 is an SEM image showing lithium transition metal oxide prepared in Comparative Example 2.

An electrode active material was prepared in the same manner as Comparative Example 1, except that the mixed powder was heated at 865° C. such that primary particles having a small particle diameter are aggregated to form a secondary particle (See FIG. 7).

Example 2

Figure 6:
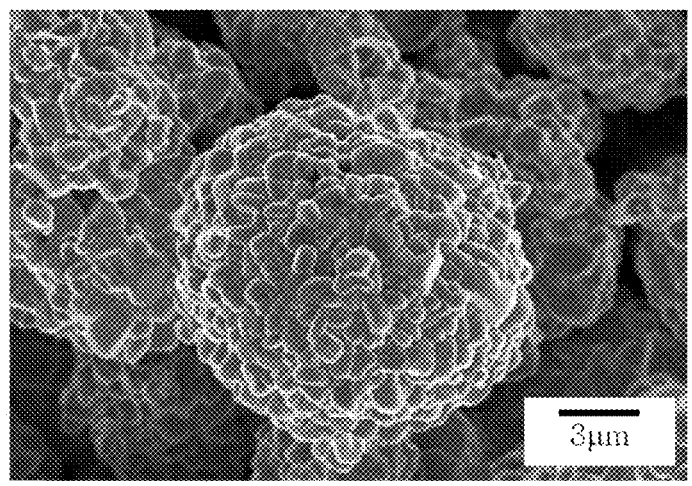
FIG. 6 is an SEM image showing lithium transition metal oxide prepared in Example 2.

An electrode active material was prepared in the same manner as Example 1, except that metal hydroxide wherein the molar ratios of transition metals, Ni, Mn and Co were 53%, 27% and 20%, respectively, was used and the heating temperature was 970° C. (See FIG. 6).

Comparative Example 3

An electrode active material was prepared in the same manner as Example 2, except that the molar number of transition metal in the transition metal salt was equivalent to that of lithium in the lithium salt and the mixed powder was heated in an electric furnace at 970° C. for 12 hours such that the average primary particle diameter was 3 μm or higher.

Comparative Example 4

Figure 8:
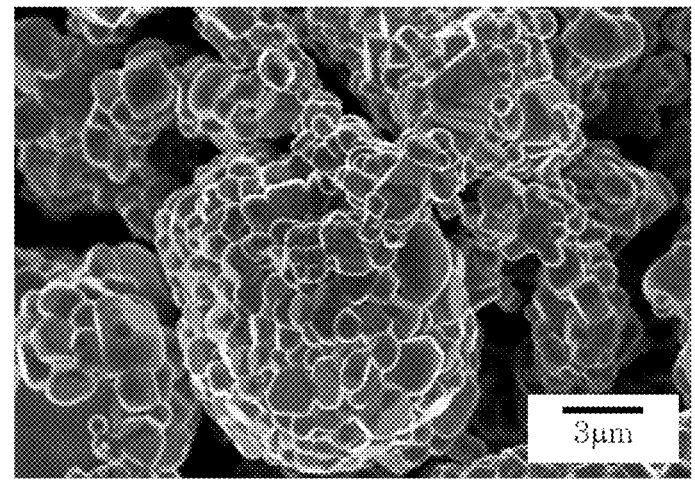
FIG. 8 is an SEM image showing lithium transition metal oxide prepared in Comparative Example 4.
Figure 9:
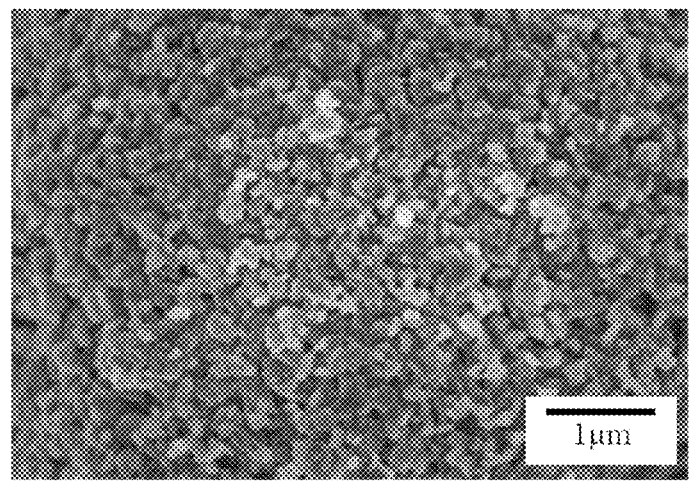
FIG. 9 is an SEM image showing lithium transition metal oxide prepared in Comparative Example 5.
Figure 10:
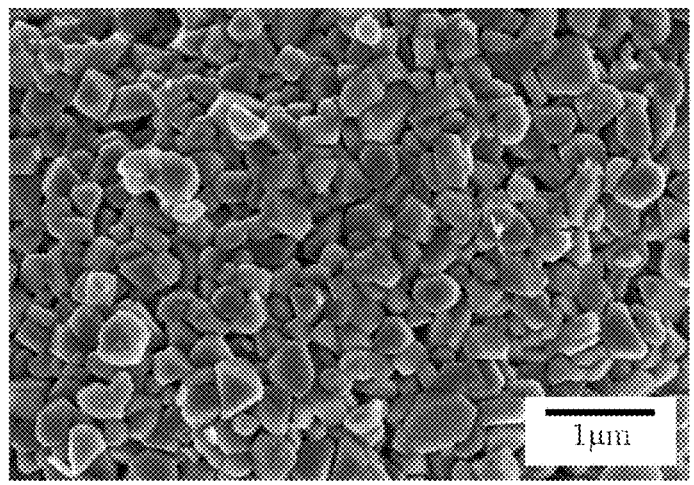
FIG. 10 is an SEM image showing lithium transition metal oxide prepared in Comparative Example 6.
Figure 11:
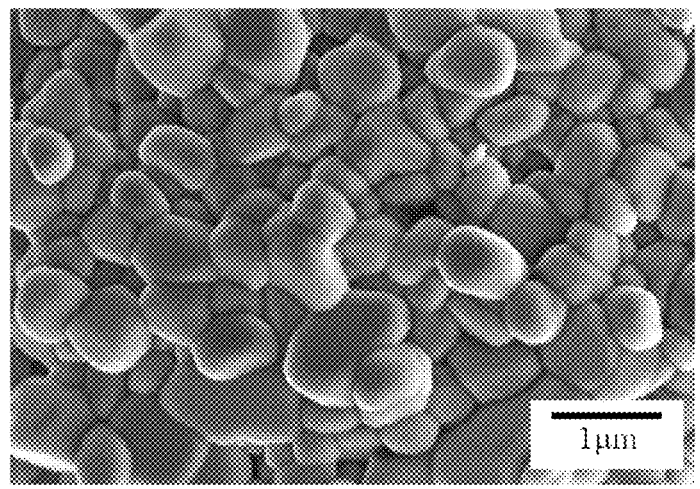
FIG. 11 is an SEM image showing lithium transition metal oxide prepared in Comparative Example 7.
Figure 12:
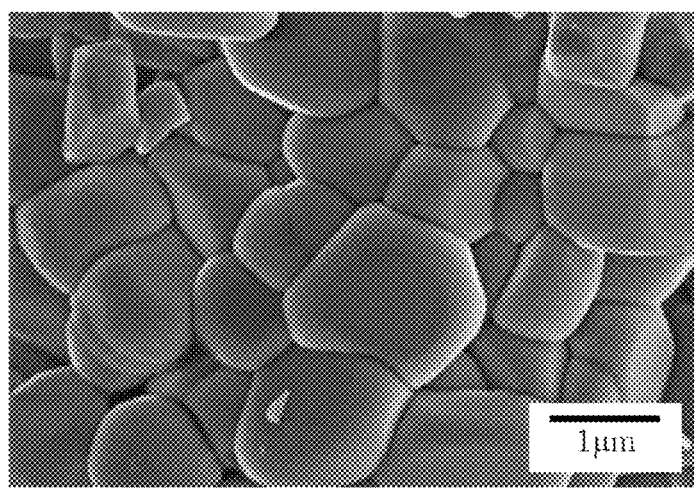
FIG. 12 is an SEM image showing lithium transition metal oxide prepared in Comparative Example 8.
Figure 13:
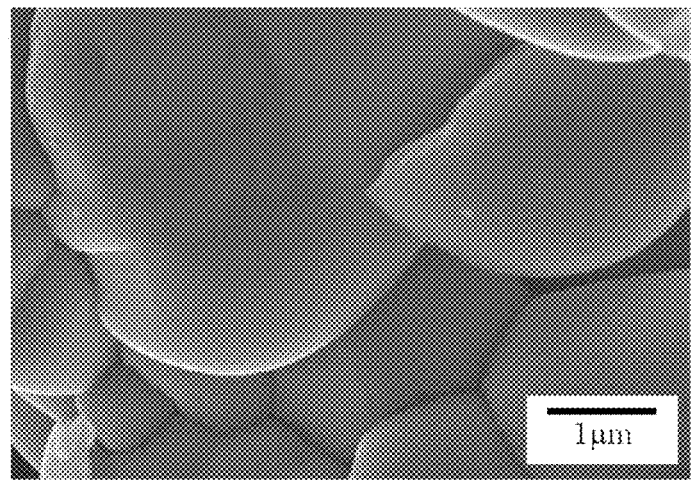
FIG. 13 is an SEM image showing lithium transition metal oxide prepared in Comparative Example 9.

An electrode active material was prepared in the same manner as Comparative Example 3, except that the mixed powder was heated at 925° C. such that primary particles having a small particle diameter are aggregated to form a secondary particle (See FIG. 8).

Comparative Examples 5 to 9

An electrode active material was prepared in the same manner as Comparative Example 2, except that the heating temperature was 700 to 910° C. (See FIGS. 9 to 13)

Experimental Example 1

The powders prepared in Examples 1 and 2, and Comparative Examples 1 to 9 were filled with a resin and fixed thereon, and the cross-section of the particles cut such that the cross-section of them was exposed was observed by SEM. 50 particles were randomly selected, the long and short axis lengths thereof were measured and the average length thereof was calculated, to obtain an average primary particle diameter. The results thus obtained are shown in Table 1 below.

Experimental Example 2

Each electrode active material prepared in Examples 1 and 2, and Comparative Examples 1 to 9, Denka Black as a conductive material and PVdF as a binder were mixed in a ratio of 95%, 2.5% and 2.5%, respectively, NMP was added to the mixture and the resulting mixture was thoroughly mixed to prepare a slurry with a suitable viscosity. The slurry was applied to an aluminum foil with a thickness of 20 μm, dried at 130° C. and roll-pressed to fabricate a battery.

A lithium foil acting as an anode, a separator and an electrolyte solution were assembled to fabricate a coin battery. The battery was subjected to electrochemical experiments. The first cycle discharge capacity was measured to obtain a discharge capacity and the results thus obtained are shown in Table 1 below.

Experimental Example 3

Ni occupancy refers to a ratio of $Ni^{2+}$ taking all lithium sites, and Rietveld refinement for X-ray diffraction patterns was performed in order to measure the Ni occupancy of electrode active materials prepared in Examples 1 and 2 and Comparative Examples 1 to 9. The results thus obtained are shown in Table 1 below.

Experimental Example 4

Electrode active material slurries prepared in Examples 1 and 2 and Comparative Examples 2 and 4 were applied to an aluminum foil to a total thickness of 200 µm and dried at 130° C. for 20 minutes to fabricate an electrode. The electrode thus dried was cut to a predetermined size and roll-pressed 3 times under a predetermined pressure. The thickness of the resulting product was measured and a thickness decrease for respective measurements was calculated. The results thus obtained are shown in Table 2 below.

TABLE 1

|  | Average primary particle diameter (µm) | Heating temperature (° C.) | Discharge capacity (mAh/g) | Ni Occupancy (atom %) |
| --- | --- | --- | --- | --- |
| Ex. 1 | 5.65 | 940 | 176.7 | 2.03 |
| Ex. 2 | 4.98 | 970 | 162.5 | 1.93 |
| Comp. Ex. 1 | 5.46 | 940 | 160.4 | 5.19 |
| Comp. Ex. 2 | 0.88 | 865 | 177.6 | 2.07 |
| Comp. Ex. 3 | 5.02 | 970 | 155.4 | 5.05 |
| Comp. Ex. 4 | 0.95 | 925 | 162.7 | 1.96 |
| Comp. Ex. 5 | 0.14 | 700 | 130.5 | 7.63 |
| Comp. Ex. 6 | 0.25 | 760 | 155.3 | 5.12 |
| Comp. Ex. 7 | 0.58 | 850 | 177.1 | 2.52 |
| Comp. Ex. 8 | 1.43 | 880 | 176.9 | 2.11 |
| Comp. Ex. 9 | 2.95 | 910 | 170.7 | 3.02 |

As can be seen from Table 1 above, a predetermined sintering temperature at which electrochemical performance is superior exists, and when sintering is performed at a temperature higher than this temperature, a large average primary particle diameter can be realized, but structural defects occur, thus causing deterioration in electrochemical performance.

TABLE 2

| | Electrode thickness decrease (µm) | | |
| --- | --- | --- | --- |
| | $1^{st}$ | $2^{nd}$ | $3^{rd}$ |
| Ex. 1 | 123.8 | 12.7 | 3.1 |
| Ex. 2 | 124.4 | 12.6 | 3.3 |
| Comp. Ex. 2 | 123.9 | 7.5 | 0.5 |
| Comp. Ex. 4 | 123.9 | 7.7 | 0.4 |

In addition, as can be seen from Table 2 above, materials having a large average primary particle diameter are readily rolled, improving processibility, decreasing the thickness of the final products, and improving space efficiency in the process of fabricating batteries, thereby contributing to improvement of battery capacity.

INDUSTRIAL APPLICABILITY

As apparent from the afore-going, the electrode active material for lithium secondary batteries comprises 50% or higher of nickel, based on the total weight of transition metals, has a layered crystal structure and has an average primary particle diameter of 3 µm or higher. The lithium secondary batteries fabricated from the electrode active material due to the large average primary particle diameter and stable structure exert superior electrochemical performance and advantageously solve problems such as slurry gelation and deterioration in battery high-temperature performance due to considerably decreased byproducts.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method for preparing an electrode active material comprising:
    mixing a lithium-containing precursor with a transition metal-containing precursor under the condition that a molar ratio of a transition metal to lithium is higher than 1; and
    heating the resulting mixture at a higher temperature, wherein the heating temperature is 10° C. or higher than a heating temperature at which lithium transition metal oxide having a layered crystal structure is prepared from a mixture of a lithium-containing precursor and a transition metal-containing precursor under the condition that the ratio of the transition metal to lithium is 1, and is lower than an oxygen deintercalation temperature of the lithium transition metal oxide,
    wherein the electrode active material comprises a nickel-based lithium transition metal oxide containing nickel (Ni) and at least one transition metal selected from the group consisting of manganese (Mn) and cobalt (Co), wherein a content of nickel is 50% or higher, based on the total weight of transition metals, and
    wherein the nickel-based lithium transition metal oxide has a layered crystal structure and an average primary diameter of 3 µm or higher.

2. The method according to claim 1, wherein the ratio of the transition metal to lithium is 1.005 to 1.30.

3. The method according to claim 1, wherein the amount of $Ni^{2+}$ taking the lithium site of the layered crystal structure is 5.0 atom % or less.

4. The method according to claim 1, wherein the amount of $Ni^{2+}$ taking the lithium site of the layered crystal structure is 0.1 to 5.0 atom %.

5. The method according to claim 1, wherein the amount of $Ni^{2+}$ taking the lithium site of the layered crystal structure is 0.1 to 4.0 atom %.

6. The method according to claim 1, wherein the nickel-based lithium transition metal oxide an average primary diameter of 3 µm to 10 µm.

* * * * *